(12) United States Patent
Moe

(10) Patent No.: US 6,388,181 B2
(45) Date of Patent: May 14, 2002

(54) COMPUTER GRAPHIC ANIMATION, LIVE VIDEO INTERACTIVE METHOD FOR PLAYING KEYBOARD MUSIC

(76) Inventor: Michael K. Moe, 1 Mann St., Irvine, CA (US) 92612

( * ) Notice: Subject to any disclaimer, the term of this patent is extended or adjusted under 35 U.S.C. 154(b) by 0 days.

(21) Appl. No.: 09/726,687

(22) Filed: Nov. 29, 2000

Related U.S. Application Data

(60) Provisional application No. 60/169,325, filed on Dec. 6, 1999.

(51) Int. Cl.[7] .............................................. G09B 15/02
(52) U.S. Cl. ..................... 84/477 R; 84/470 R; 84/478; 84/483.2; 84/485 R
(58) Field of Search .............................. 84/600, 470 R, 84/471 R, 475, 477 R, 478, 479 A, 483.2, 484, 485 R

(56) References Cited

U.S. PATENT DOCUMENTS

| | | | | |
|---|---|---|---|---|
| 5,159,140 A | * | 10/1992 | Kimpara et al. ............... | 84/600 |
| 5,886,273 A | * | 3/1999 | Haruyama ................... | 84/478 |
| 6,066,791 A | * | 5/2000 | Renard et al. ............ | 84/477 R |
| 6,087,577 A | * | 7/2000 | Yahata et al. .................. | 84/478 |
| 6,024,441 A1 | * | 3/2001 | Asahi et al. ............... | 84/470 R |

* cited by examiner

*Primary Examiner*—Marlon T. Fletcher
(74) *Attorney, Agent, or Firm*—Lyon & Lyon LLP

(57) ABSTRACT

The present invention provides apparatus for, and novel methods of representing the content of a musical score in an animated format that graphically prompts the user of a keyboard instrument. The graphic format elucidates features of the score in a way that may also be useful as a supplement to conventional keyboard instruction. The animation is displayed on the screen of a computer monitor together with a live video image of the user's hands on a musical keyboard. Viewing only the images on the monitor, the user guides his fingers to the keys targeted by the animation. He is thus able to play the proper keys on the real keyboard without diverting his eyes from the monitor. In the preferred embodiment, the system provides a real time display of both the score information, keyboard and the user's hand placement relative to the keyboard. Preferably, the display of the musical score includes a note position depicted in a horizontal relationship to the keyboard, and includes a temporal indication for the notes.

31 Claims, 6 Drawing Sheets

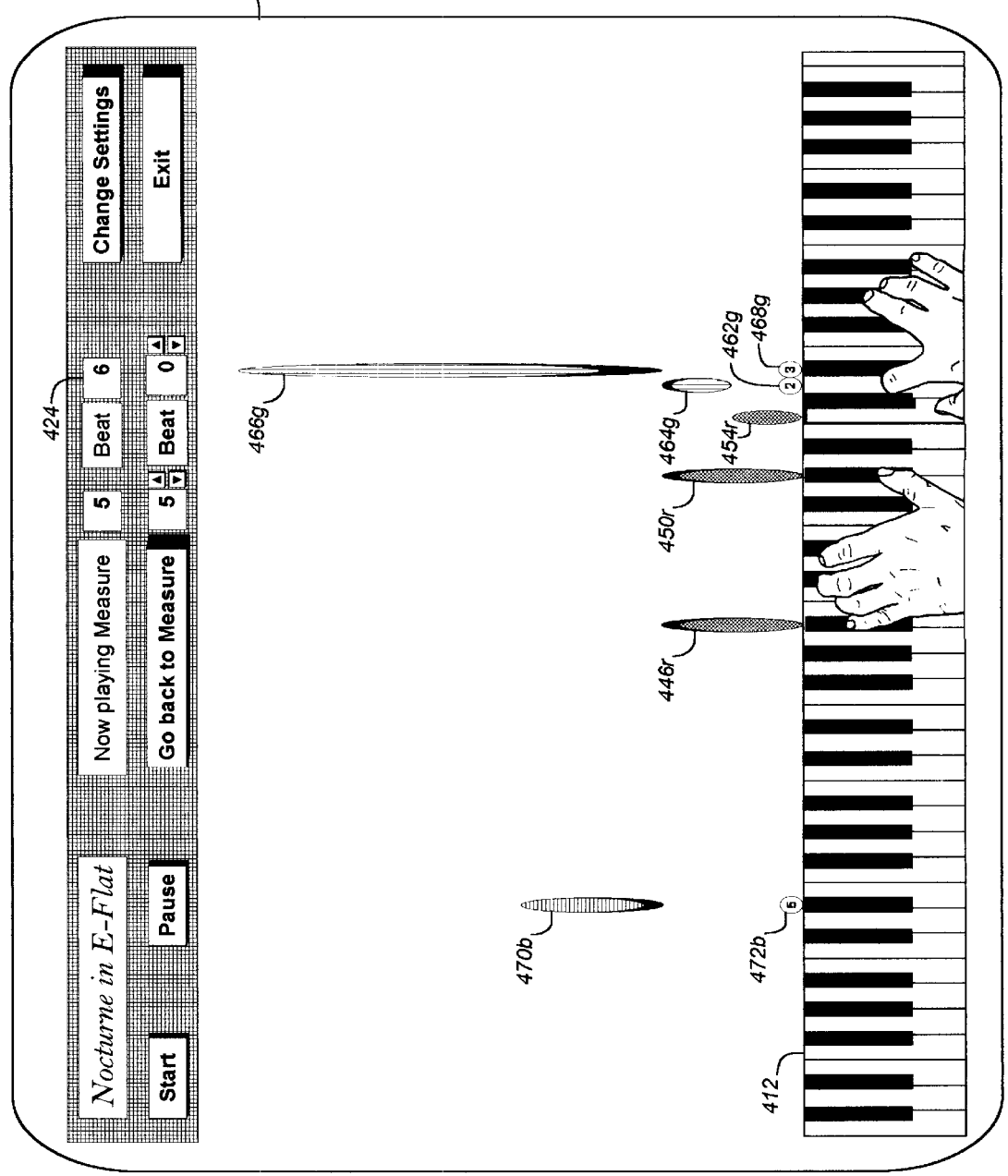

COMPUTER GRAPHIC ANIMATION, LIVE VIDEO INTERACTIVE METHOD FOR PLAYING KEYBOARD MUSIC

RELATED APPLICATION INFORMATION

This application claims priority from provisional patent application 60/169,325, filed Dec. 6, 1999, entitled "Computer Graphic Animation—Live Video Interactive Method for Playing Keyboard Music".

FILED OF THE INVENTION

This invention relates generally to systems and methods for facilitating playing music. More particularly, the invention relates to systems, apparatus and methods for providing a graphical animation for use in playing musical instruments, particularly keyboard instruments.

BACKGROUND OF THE INVENTION

The invention relates generally to automated multimedia systems, and, more specifically, to a computer-based system for prompting the player of a musical keyboard.

Playing a musical keyboard can be an enjoyable experience. Most people have attempted it, but a relative few have mastered it, largely because of the initial difficulty and the hours of dedicated study and practice required. The many competing claims on a person's time usually leave insufficient room for the regimen of keyboard practice. Parents who spend thousands of dollars on piano lessens for their children, often see their youngsters quit in frustration after a couple of years of struggle.

Various schemes, often based on computers, have been devised to assist with the learning process. Some of this software is very good at providing instruction in traditional keyboard methods in which the student learns to read the notes on the staff of a musical score, whether it be printed or displayed on a computer monitor. For example, Yamaha Corporation produces "Disklavier Pro 2000" including an LCD screen to view digital sheet music and video music performances that sync to the moving keys.

A major obstacle remaining for many students of the traditional method, however, is the large amount of continuous information processing required of the brain to translate the arcane notation of printed music into the corresponding motor commands to the fingers. Keeping track of sharps and flats amid a stream of chromatic signs, recognizing notes well above or below the staff, and executing of all the various notational nuances can be particularly daunting.

Some schemes attempt to address this problem by using a system of lights near or inside of the keys to indicate which keys are to be played at a given time, but this approach can only crudely guide the performance. The lights are unable to convey much of the auxiliary information coded in a piano score. There are about a dozen primary parameters that can be associated with a note to carry instructions as to how that note should be played. A key's light being either on or off can transmit only a fraction of this information. Another serious shortcoming of these methods is the inability of the user to scan upstream in the flow of approaching notes. This deficiency impairs his ability to smoothly position his hands in anticipation of notes drawing near their instant of play. Prior art with relevance to the present invention includes:

U.S. Pat. No. 4,926,734 issued to Rickey sets forth GRAPHIC/TACTILE MUSICAL KEYBOARD AND NOMOGRAPHIC MUSIC NOTATION in which a graphic/tactile musical instruction system includes a three-row equal temperament whole tone graphic/tactile keyboard and a nomographic system of music notation. The nomographic notation is correlated to the keyboard by nomographically marking the lines and spaces of the stave adjacent the key signature and similarly graphically marking the notes played on the upper or lower row with a diagonal slant.

U.S. Pat. No. 5,153,829 issued to Furuya, et al. sets forth MULTIFUNCTION MUSICAL INFORMATION PROCESSING APPARATUS which includes: a unit for displaying on a screen a musical score, keyboard and tone time information to be inputted; a unit for designating the position of the keyboard, and tone time information, respectively displayed on the display unit; a unit for storing musical information produced through designation by the designating unit of the position of the keyboard and tone time information displayed on the display unit; a unit for controlling the display of the musical score, keyboard and tone time information on the screen of the display unit, and for controlling the display of a pattern of musical tone or rest on the musical score on the display unit in accordance with the position of the keyboard and tone time information respectively designated by the designating unit; and a unit for generating a musical tone by reading the musical information stored in the storage unit.

U.S. Pat. No. 5,315,911 issued to Ochi sets forth MUSIC SCORE DISPLAY DEVICE including a storage device for storing music score data, a display device for displaying the music score data for each specified section, and a comparator for comparing the musical playing data supplied from a player with the music score data. The music score display device further has a retrieval device for retrieving a playing position according to the compared result of the comparator, and a display controller for controlling display section of the display device based on the retrieval result of the retrieval device.

U.S. Pat. Nos. 5,533,903 and 5,746,605 issued to Kennedy set forth METHOD AND SYSTEM FOR MUSIC TRAINING including a method of and computer system for training a student to play a musical work having an identifiable rhythm structure, the musical work being decomposable into a plurality of variations each maintaining the identifiable rhythm structure. According to the method, a musical score of each variation is generated and then the musical scores are arranged in order of rhythmic difficulty. An animated movie is then generated, the movie comprising the music score of at least one variation, a sound recording of the music score, a graphic device that highlights the identifiable rhythm structure and a representation of how the music score would be played on a musical instrument. The animated movie is then presented to the student.

U.S. Pat. No. 5,583,308 issued to Owen sets forth MUSICAL EFFECTS APPARATUS AND TONE CONTROL PROCESS FOR A MUSICAL INSTRUMENT. In an automated system for learning to play a musical instrument, music data and tone control data for a musical composition of an exemplary musical instrument is stored in machine readable form. An audio signal generated by a musical instrument being played, corresponding to the exemplary musical instrument, is inputted through a musical effects apparatus wherein the musical tone of the musical instrument being played is mixed with the stored music data. The musical effects apparatus is utilized, under digital control, to match the musical tone of the musical instrument being played with that of the exemplary musical instrument.

U.S. Pat. No. 5,585,583 issued to Owen sets forth INTERACTIVE MUSICAL INSTRUMENT INSTRUCTION SYSTEM in which a musical instrument instruction system utilizes a CD-ROM electronic storage medium to store audio and video musical instrument instructional materials. Instructional materials are accessed utilizing a computer which provides an interactive system in which animation, voice, music, video and imagery are integrated in essentially real time and under complete control of the music student. The system permits the student to access the instructional materials in a variety of ways, and control the parameters governing the presentation of the instructional materials, including control of the tempo of the music and whether or not displays of the maimer of playing the musical instrument will be shown with a displayed notation or tablature relating to the selected musical piece. A mixer is provided for combining musical output of the practice instrument with musical output generated by the computer corresponding to the selected musical piece.

U.S. Pat. No. 5,690,496 issued to Kennedy sets forth MULTIMEDIA PRODUCT FOR USE IN A COMPUTER FOR MUSIC INSTRUCTION AND USE in which a computer is used to assist a student to learn to play a given musical work previously recorded on a master recording. A method of making the product is described which ensures that multimedia representations of the work are properly synchronized to the actual tempo variations, if any, in the master recording. A method of using the product for music training is also described.

U.S. Pat. No. 5,728,960 issued to Sitrick sets forth MULTI-DIMENSIONAL TRANSFORMATION SYSTEMS AND DISPLAY COMMUNICATION ARCHITECTURE FOR MUSICAL COMPOSITIONS in which a musical display system produces a display presentation in one of a plurality of formats from an original musical composition, the formats being created from the original musical composition responsive to input variables and a selected operating mode. The system is comprised of means to receive the original composition, a memory, a selection subsystem, a controller, and a display subsystem. The display system provides for selection of original compositions, creation of derivative compositions, distribution of compositions, monitoring of each performer's performance, and also allows for retrieval and editing of musical compositions, such as changing keys, pitch, tempo, and many other parameters.

U.S. Pat. No. 5,908,997 issued to Arnold, et al. sets forth ELECTRONIC MUSIC INSTRUMENT SYSTEM WITH MUSICAL KEYBOARD comprising: an electronic music instrument, having selectable groups of reproducible sounds and individually selectable reproducible sounds; a signal generator for energizing an audio amplifier responsive to different digital audio sources, including the groups of sounds and the individual sounds a graphical user interface for displaying at least one control graphic representing controllable parameters of the audio signals generated by the generator; and, a controller responsive to operation of the control graphic for adjusting the controllable parameters of the generator and for selectively coupling different ones of the sources to the generator. The graphical user interface can comprise: a video display; and, a touch-responsive overlay. The controllable parameters can include multiple instrument sound selection and sound layer assignment, controlled responsive to operation of the at least one control graphic.

U.S. Pat. No. 6,042,555 issued to Kramer, et al. sets forth FORCE-FEEDBACK INTERFACE DEVICE FOR THE HAND in which a man-machine interface is disclosed which provides force information to sensing body parts. The interface is comprised of a force-generating device (106) that produces a force which is transmitted to a force-applying device via force-transmitting means. For example a glove employing force feedback may be programmed to teach finger dexterity, finger timing and even the motions necessary to learn some musical instruments. If the user were learning the piano, as fingers are flexed, the user would receive fingertip pressure from virtual keys signifying to the user that he had pressed the key.

U.S. Pat. No. 6,066,791 issued to Renard, et al. sets forth SYSTEM FOR INSTRUCTING THE PLAYING OF A MUSICAL INSTRUMENT which discloses a novel method and apparatus for instructing a student how to play a musical instrument. The method includes providing a display device, displaying a staff on the display device, displaying an image on the display device, and instructing the student to focus on the image while preferably using a musical instrument to play the notes on the staff, wherein the image moves generally in the direction of the progression of notes on the staff while the student attempts to play the, notes with the musical instrument. As the image moves, the image preferably moves in a direction generally parallel to the staff.

Although the prior art addresses musical keyboard playing in various ways, none includes a live video image of the player's hands interacting with on-screen animation. For those who would like to read keyboard music and play it with their own hands, but who would welcome a simpler alternative to mastering the skill of sight reading a musical score, there is a need for a system that can reduce the amount of mental information processing involved, while preserving all of the information a score contains. The present invention fulfills this need, and provides other distinct advantages.

SUMMARY OF THE INVENTION

The present invention provides a method of representing the content of a musical score in an animated format that graphically prompts the user of a keyboard instrument. Intended primarily for pleasure, the graphic format elucidates features of the score in a way that may also be useful as a supplement to conventional keyboard instruction. The animation is displayed on the screen of a computer monitor together with a live video image of the user's hands on a musical keyboard. Viewing only the images on the monitor, the user guides his fingers to the keys targeted by the animation. He is thus able to play the proper keys on the real keyboard without diverting his eyes from the monitor. At the same time, he bypasses the intense mental information processing involved in reading printed sheet music.

In the preferred embodiment the monitor is supported at eye level near the position otherwise occupied by sheet music. A video camera is mounted about four feet above the center of the keyboard, and is directed downward. The resulting keyboard image is displayed at the bottom and across the full width of the monitor screen. Across the top of the screen is a tool bar for controlling and monitoring the displayed material. The mid-screen area is devoted to the animation. Here the horizontal co-ordinate represents position along the keyboard in one-to-one correspondence with the bordering keyboard image below. The vertical co-ordinate represents time, increasing from bottom to top. Objects higher on the screen represent events that occur later than objects lower on the screen. The present time is defined as the lower edge of the animation area where it borders the keyboard image. All objects in the animation area move steadily downward until they touch the border, at which point they have arrived at the present.

A musical note is represented by a "sprite" typically elliptical in shape, initially appearing directly above, and moving down-screen toward the image of the corresponding key. The distance of the sprite from the key image is a measure of the time remaining until the key is to be played. This shrinking distance gives the user time to take aim at the targeted key, and to anticipate the moment of play.

To keep the screen uncluttered, a sprite does not appear until the corresponding note is within one beat of play. The vertical length of the sprite represents the duration of the note. A quarter-note sprite, for example, is twice as long as an eighth-note sprite. The key is played when the sprite first touches the key image. While maintaining the same downward speed, the sprite then appears to slide behind the key image, and the key is held until the last of the sprite disappears from view.

Through the use of color, shape, and other features, the sprites are designed to carry all of the information contained in the musical score. For example blue sprites represent notes to be played with the left hand, and green with the right hand. Both colors switch to red at the instant of contact with the key image to announce the moment of play. The degree of blue or green color saturation indicates the loudness of a note, ranging from pale colors for pianissimo, to rich colors for fortissimo. Pedaling is represented by a black bottom edge on a sprite for pedal down, and a black upper edge for pedal up.

The style of attack is indicated by the degree to which the leading and trailing edges of the elliptical sprite are clipped, ranging from no clipping for the smoothly joined notes of legato, through progressively more severe clipping for portamento and staccato. A totally squared off leading edge indicates the "hammered" note requested by a martellato.

Fingering is suggested for each note by an Arabic numeral within a small circle of the same color as the approaching sprite, and fixed in position with its lowest point in contact with the targeted key. The colored circle helps to identify the key while the sprite is still some distance away.
The circle appears simultaneously with the sprite, and disappears when touched by the sprite.

The various parameters for a note are included as fields of a record in a "piece file", which is an array of such records for all of the notes in a particular piece. The first record in the array is a dummy note with its fields containing initialization information such as the time signature, default metronome setting, and total number of measures in the piece. A library of piece files is made available for downloading from the Internet, on CD-ROM or other storage medium for loading into computer memory.

The user exercises control over the animation from two access points. The first is the Set-Up Screen that appears just after an Opening Screen when the program is launched. The Set-Up Screen is where the user chooses a piece from the library, and initializes the fundamental operating parameters, such as the metronome setting, start and stop points, the magnitude of tempo variations, and whether to repeat the selected measures when finished. There he also selects from a series of options for audio features. For some pieces there will be a choice of the style of different artists, as reflected in the tempo variations and treatment of loud and soft passages. The user can also return to the Set-Up screen at any time to change these settings. The second control point is the monitoring and control tool bar at the top of the Action Screen where the animation is displayed. These controls let the user jump backward or forward in the piece, start, stop, or pause the action, etc.

The invention does not magically eliminate the need for practice. One still must play a piece many times to become proficient, but the mental effort is greatly reduced. Freed of the burden of reading the sheet music, the user can concentrate on training his fingers to quickly assume the indicated patterns. The user's interaction with the animation is rather like that of a video game, and practice is fun. Because it is fun, it happens, and rapid progress is the result.

The accompanying drawings and detailed description offer further clarification of the features and advantages of the invention.

BRIEF DESCRIPTION OF THE DRAWINGS

FIG. 6 shows a graphical display of the image of FIG. 4 and FIG. 5, but at a yet later point in time.

DETAILED DESCRIPTION

Figure 1:
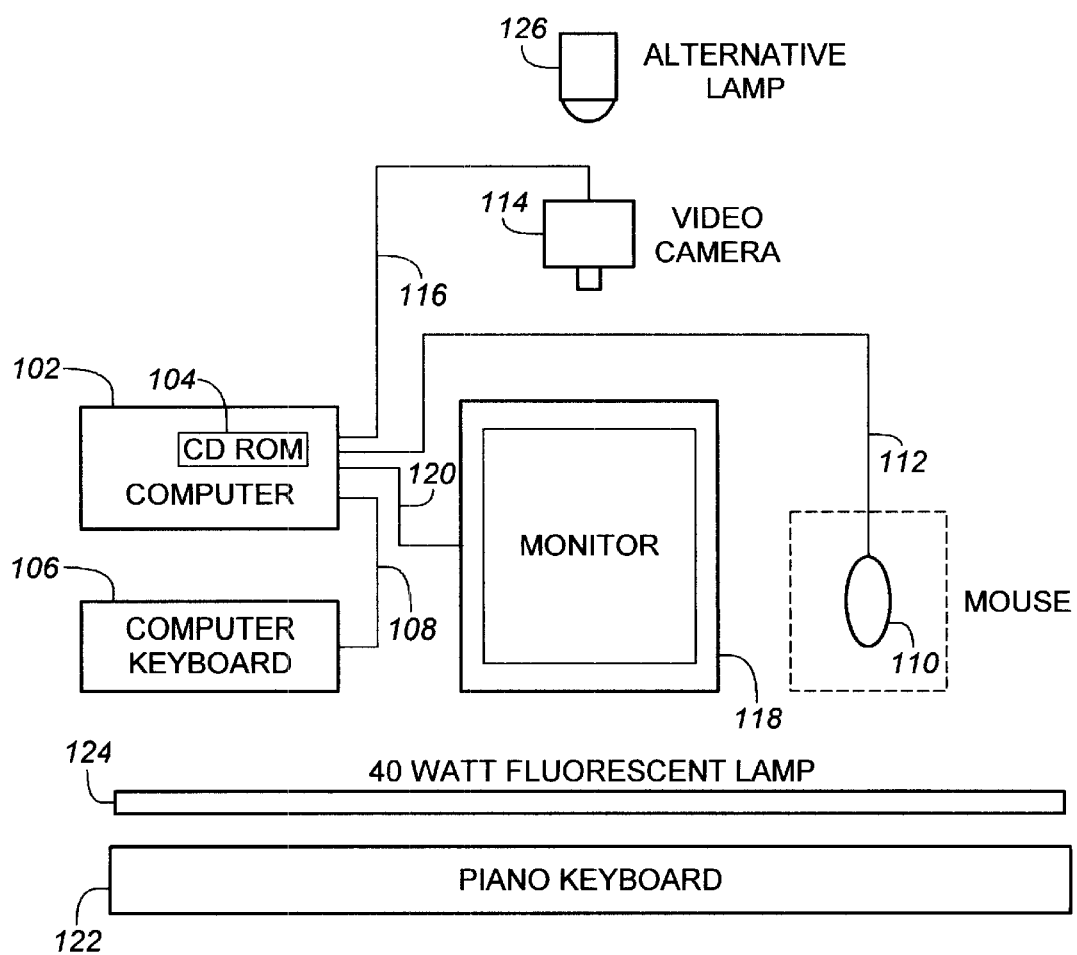
FIG. 1 shows a block diagram of the components of one implementation of this invention.

FIG. 1 shows a block diagrammatic view of the components of the system in the preferred embodiment. A computer 102 is provided to effectuate control of the system. The prototype is a conventional IBM-compatible PC with a 133 MHz Pentium processor, 16 MB of RAM and a 1.9 GB hard drive. Included is a "frame grabber" card to take input from a video camera, and software for sizing and positioning the associated video image on the monitor. (A more portable alternative would be a laptop computer with a universal serial bus (USB) port, which can also be configured to accept input from a video camera.) In yet another simpler embodiment, an LED array may be used, and optionally, integrated with the keyboard instrument. As is required for the operation of the computer 102, the system may include a mass storage type device, e.g., a CD ROM drive 104, and various input devices such as a computer keyboard 106 (connected by cable 108) and mouse or other control device 110 (connected by cable 112 to the computer 102).

A color video camera 114 is located approximately 48 inches directly above the piano keyboard, and oriented to produce an unobstructed, upright image of the keyboard across the top of the frame, with the low notes on the left. A connecting cable 116 couples to the computer 102. The prototype is a cheap ($100) camera based on the NTSC standard and produces a satisfactory picture, although a suitably fast digital camera would give a superior image. The focal length of the camera lens is chosen to yield an image of the piano keyboard of the size described under 118. The camera support in the preferred embodiment is a tripod-like structure with one leg resting on each of the small platforms existing at the ends of most piano keyboards, and the third leg being weighted at the bottom and adjustable in length and angle, rests at a convenient position on top of the piano. This structure also supports the lamp, and optionally the computer monitor.

A computer monitor 118 is provided for viewing by the user. Suitable specifications are an SVGA monitor at 1024× 768 resolution, 16-bit color (although the application would also work with 8-bit palletized color,) and a 17-inch diagonal with 75 Hz refresh rate (CRT monitor) or 15-inch diagonal with 60 Hz refresh rate (flat panel monitor). Built-in speakers are a useful option. The monitor 118 is connected by cable 120 to the computer 102.

The video image of the piano keyboard appears at the bottom of the monitor display, and spans the entire width of the screen. At 1024×768 resolution it is necessary to truncate the keyboard in the video image to make the remaining keys appear sufficiently large. The top 12 and the bottom 3 keys are omitted. On the rare occasions when these extreme keys are played, their use is indicated by a special coding in the animation. Although this arrangement is satisfactory, a larger monitor with a horizontal resolution greater than 1234 would accommodate the full keyboard image. A digital monitor is also an option. The prototype monitor is a flat panel display resting on top of a closed grand piano. A more universally adaptable arrangement would replace the manufacturer's stand with one designed to rest on the piano's existing music stand. Alternatively, the monitor could be mounted on the frame that supports the video camera and its lamp.

Other types of suitable display devices include a touch screen monitor, and a virtual reality device. Another option is a specially designed flat panel, or tiling of flat panel monitors placed in contact with an actual keyboard.

A musical keyboard 122 is shown in the drawing of FIG. 1. The keyboard is preferably a relatively stationary keyboard, such as a piano or organ. However, the invention may be applied to other instruments where the physical positioning of the hands relative to keys, valves or other actuatable element may be imaged.

A lamp 124 of some sort is often necessary to eliminate shadow between the black keys when room lighting is predominantly from one side of the keyboard. A lamp can also eliminate the shadow cast on the keys by the user when the room lighting is predominantly behind his back. A forty-watt fluorescent lamp mounted about five inches above the back of the keyboard provides uniform illumination of the keys for the video camera. A standard 40-watt fluorescent tube is the same length as a standard piano keyboard. The lamp is customized to minimize its bulk and to direct its light downward.

A more practical alternative to the fluorescent lamp, but one providing somewhat less-uniform illumination, is an appropriately collimated spotlight 126 mounted above and a little forward of the camera. Other lighting arrangements are possible as well, as long as, day or night, they provide the dominant source of light on the keyboard and a satisfactory video image.

Figure 2:
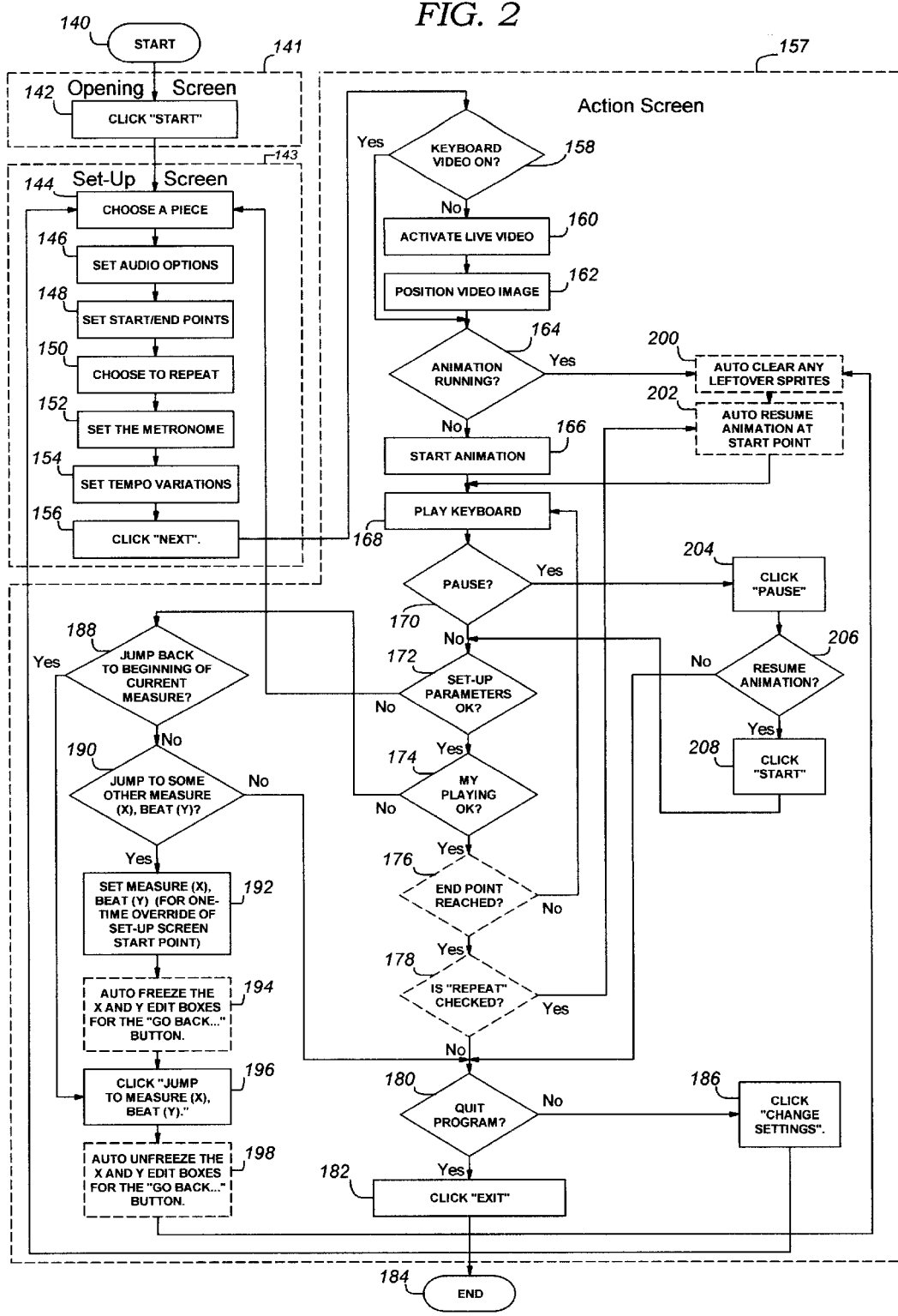
FIG. 2 shows a flow chart of an implementation of this invention.

FIG. 2 is a user flow chart illustrating the steps of human interaction with the graphic animation and live video image. Dashed lines, other than those outlining the three screens, indicate decisions or functions that are performed automatically by software, and do not require any response from the user. When starting the system (block 140), first to appear on the monitor is the Opening Screen (block 141). This is a full-screen display with some artwork and a welcoming message accompanied by an audio clip of piano music.

Figure 3:
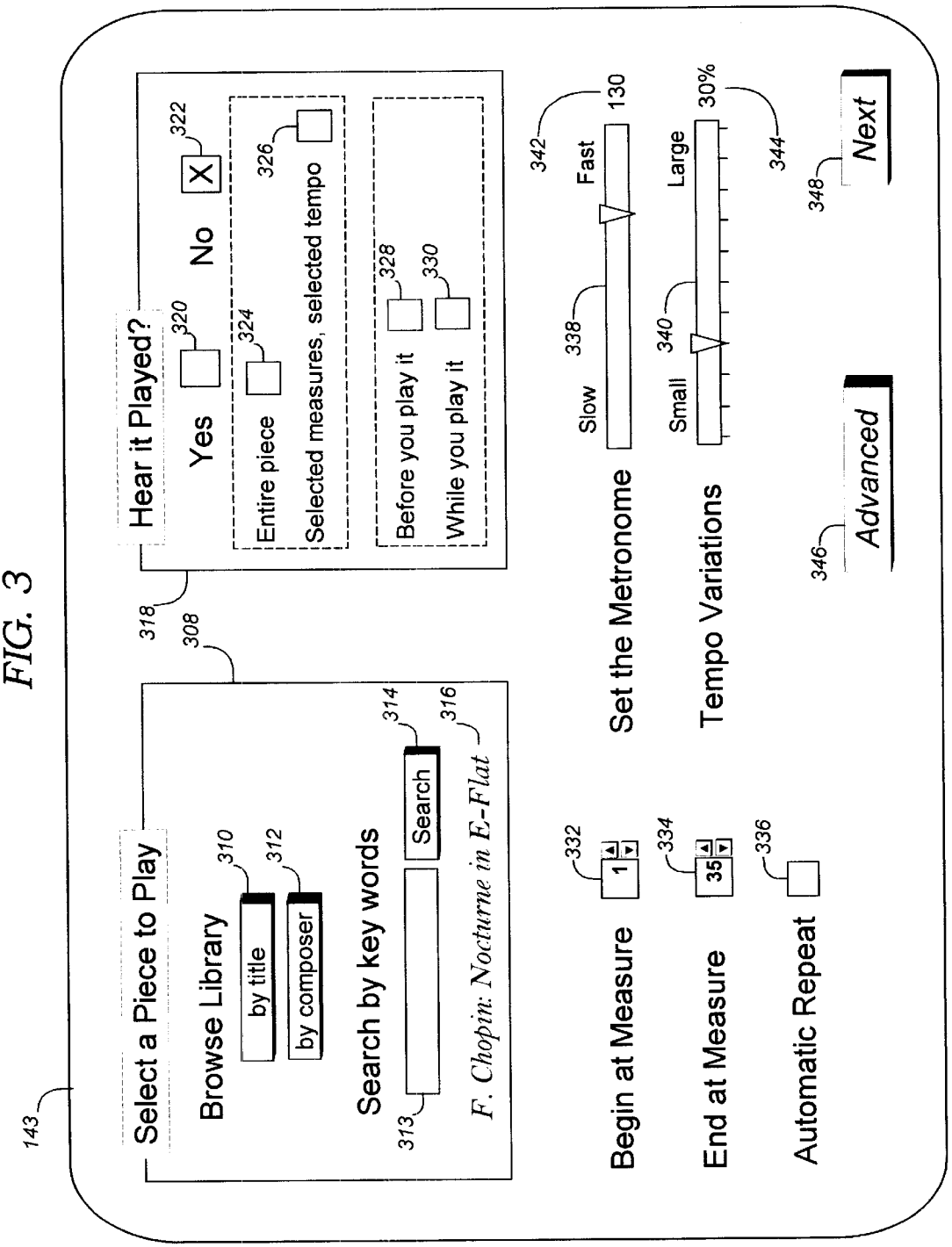
FIG. 3 shows a planned view of a graphical display for interface with the user.

The user clicks "Start" (block 142) to hide the Opening Screen and advance to the Set-Up Screen (block 143), which is shown in detail in FIG. 3. This full-screen display provides access to a library of piano pieces, and contains various track bars and edit boxes where one chooses the set-up parameters governing the animated presentation of the selected piece. After a piece is chosen (block 144), a coded version of the score, called the Piece File, is loaded into memory from the hard drive. The Piece File for a typical classical composition is a few tens of kilobytes, so the entire file fits easily into RAM. Disk reads and the associated delays, therefore, are unnecessary during performance.

Default settings for the chosen piece are loaded into the remaining Set-Up-Screen parameters. The first of these (block 146) is a yes/no pair of check boxes indicating whether the audio feature is enabled. The default is "No".

The user next moves on to select a Start Point (block 148), where the default is Measure 1, and an End Point, where the default is the last measure of the selected piece. The next option is a check box where one can choose to repeat (block 150) the selected measures. The default is unchecked. Checking the box causes the animation to cycle indefinitely through the selected measures, with a brief pause before each restart. Next encountered is the "Set the Metronome" option (block 152), which defaults to the number of beats per minute indicated on the score. Another choice in the Set-Up Screen is the degree of tempo variation (block 154). Finally, the user has the opportunity to select advanced options. The above features of the Set-Up screen are discussed in greater detail under FIG. 3. When finished, the user clicks "Next" (block 156), to hide the Set-Up Screen and bring up the Action Screen (block 157).

The Action Screen (FIG. 4) is a full-screen display where the animation of the piano score takes place and the live video image of the keyboard appears. Across the top is a monitoring and control bar containing various buttons and edit boxes. Upon opening the Action Screen, if (block 158) the keyboard video has not been activated, the user is prompted (block 160), to turn on the camera and lamp, and open the frame-grabber software. He then sizes and positions the video image (block 162) to bring it into registration with a dummy image of the keyboard across the bottom of the screen. (In future applications, some or all of these video initialization tasks may be performed automatically by software.)

Once the live video of the keyboard is displayed in the proper position, the user notes whether the animation is running. If (block 164) animation is running, the program automatically clears any leftover activity (block 200), pauses about one second and resumes animation at the currently enabled start point (block 202). If at block 164 the animation is not running, the user clicks the "Start" button (block 166), which launches the animation or, if the animation had been paused, clears the leftover sprites and after a one-second delay, resumes the animation at the current start point. While the animation is running, the "Now playing Measure X, Beat Y" edit boxes on the toolbar are automatically updated with current values for X and Y. Guided by the animation and the adjoining video image of his hands upon the keys, the user plays the instrument, (block 168). If (block 170) at any time he chooses to pause the animation, he clicks (block 204) the "Pause" button, and all moving sprites freeze in place. If (block 206) he wishes to resume, he clicks (block 208) the "Start" button, the sprites unfreeze, and motion resumes where it left off. If he chooses not to resume, he decides (block 180) whether to quit the program, or to activate a return (block 186) to the Set-Up Screen (block 143).

Should the user become dissatisfied with the Set-Up parameters (block 172), he can click the "Change settings" button on the toolbar, which hides the Action Screen and returns the Set-Up Screen where the initial selections are still displayed, awaiting any changes. Should the user otherwise become dissatisfied with his own performance (block 174), he can choose to jump back to the beginning of the current measure (block 188), or jump to some other measure and/or beat (block 190). In the "Jump to Measure X, Beat Y" edit boxes, the Y default remains at zero. If a number for Y is entered manually it persists until removed manually. The X default is automatically updated to the measure in play, unless a number for X has been entered manually (block 192), in which case the manual entry locks in (block 194) until the lock is released (block 198) by clicking the "Jump to Measure X, Beat Y" button (block 196). This button returns control to block 200 where old sprites are cleared, and animation resumes (block 202) at the X, Y Start Point indicated in the button's edit boxes. Arrival at block 200 by any other path causes the Start Point to revert to the beginning of the measure selected on the Set-Up Screen.

If (block 176) the End Point selected on the Set-Up Screen has not been reached, animation and play continue (block 168). If the end has been reached, the animation area clears, and if (block 178) there is a check in the "Repeat" box on the Set-Up Screen, control returns to block 202, and after a 1-second pause, the cycle repeats. If there is no check in the "Repeat" box, the user decides (block 180) to click either the "Change settings" button (block 186) and return to the Set-Up Screen, or the "Exit" button (block 182) and end the session (block 184).

Referring to FIG. 3, the Set-Up Screen 143 follows the Opening Screen. Here the user chooses a piece to play and sets the parameters of the animated display to suit his taste and level of advancement. He can choose to work on a subsection of the piece, set various audio options, etc.

The piece selection tools 308 allow the user to browse the library of choices stored in RAM and/or other appropriate medium such as CD ROM. Clicking the "by title" button 310 opens a window with library selections listed alphabetically by name of piece. The letters A, B, C . . . across the top of the window can be clicked to jump to pieces beginning with that letter, or the list can be scrolled. The "by composer" button 312 works similarly. Box 313 is available for typing in key words in combination with Boolean operators. Clicking the "Search" button 314, opens a window with the search results. Whether chosen by browsing or searching, the name of the selected piece 316 appears on the Set-Up screen after the choice is clicked and the browse or search window is closed.

The audio options 318 can be ignored by the user. The default is no audio, and a check appears in the "No" box 322. The remaining choices in 318 are grayed out. Or the user can choose to hear the piece played by a professional musician by clicking the "Yes" check box 320, and the subsequent choices in 318 become available. The first of these is whether to listen to the entire piece at full tempo, check box 324, or, check box 326, to hear only the measures selected below in boxes 332 and 334 at the tempo resulting from the choices in boxes 338 and 340. In the case of a check in 326, the pitch is maintained independent of the tempo by means of prior art (U.S. Pat. No. 5,583,308). The user then chooses whether to hear the professional version before he plays it, check box 328, and/or while he plays it, check box 330. Boxes 324, and 326 are mutually exclusive. Boxes 328 and 330 are not.

The user next moves on to select a Start Point in the "Begin at Measure" edit box, 332. The default is Measure 1. He can type in a different measure number, or use the up-down arrows associated with the edit box to scroll to a number of his choice. Should he select a measure outside the range of the piece, the program displays an error message to that effect, and pauses while he corrects the mistake. If the new choice is within range, the error message will disappear when he exits the edit box. Next he selects an End Point in the "End at Measure" edit box, 334 where the default is the last measure of the selected piece. The procedure is similar to that for the Start Point choice, with a similar trap for out-of-range choices. If the same number is entered in both the Start Point and End Point boxes, the animation will start at the beginning of the selected measure, and stop at the end of that measure.

The next option is a check box 336 where one can choose to repeat the selected measures. The default is unchecked. Checking the box causes the animation to cycle indefinitely through the selected measures, with a brief pause before each restart. Next encountered is the "Set the Metronome" option, a trackbar 338 that defaults to the number of beats per minute indicated on the piano score. The user can override the default by moving the slider back and forth to select any integer between 10 beats per minute and 125% of the default. The metronome setting is displayed 342 to the right of the trackbar. A user who is unfamiliar with the selected piece will likely want to begin with the metronome slowed well below the default setting.

The next choice in the Set-Up Screen is the degree of tempo variation. Many musical scores include notation for speeding up and slowing down the tempo from the nominal metronome value. The magnitude of these variations is subject to artistic interpretation. The preferred embodiment of the invention errs on the high side for the magnitude of variations programmed into the Piece File. Tempo variations, when large, can present difficulty to a user just beginning to work with a new piece. The trackbar 340 lets the user select the magnitude of the tempo variations between 0 and 100% of the values programmed in the Piece File. The selection is displayed 344 to the right of the trackbar. A setting of 0% produces a steady metronome tempo with no variation at all. The default is 30 percent. Whatever the trackbar setting, the tempo variation manifesting in the animation also scales with the metronome setting.

The "Advanced" button 346 brings up a window with additional options. These can include recording and playing back the performed measures, optionally interleaved with a recording of those same measures as played by a professional artist. The playback can be heard through speakers, or player-piano actuation of the keys themselves. Further possibilities are options for overriding Piece-File programming for fingering, tempo variations, and loudness, and for saving the resulting customized version of the Piece File with a "Save As" command. Other embodiments might also include various prior-art instructional enhancements to the animation display such as simultaneous viewing of the musical score, with a cursor at the point of play. Also available might be alternative sprite forms with appeal to youngsters of various ages. For example, for very young children the sprites could resemble cartoon characters. Boys age 7 to 14 might prefer rockets or bombs in a video-game-like format where points are awarded for correctly played notes, and "catastrophic" explosions accompany mistakes. "3D" enhancements to the animation may be incorporated for added excitement for this group of users. Optional sensors in the keys supply the required feedback for monitoring performance and correction of mistakes. Further options include accompaniment for the user, such as the part of the left hand alone, the primo or secondo of a duet, or the orchestral part of a concerto.

If a piece has been selected, the "Next" button 348 hides the Set-Up Screen and brings up the Action Screen 157. If he has not chosen a piece, the user is prompted to do so. The Set-Up screen persists until a choice of piece is made. Additionally, if upon clicking the Next button, the selected ending measure number is not equal to or greater than the selected starting measure number, an error message requests the correction, and the program pauses while the change is made. The message disappears upon exit of the corresponding edit box, and the Next button can be clicked again.

Figure 4:
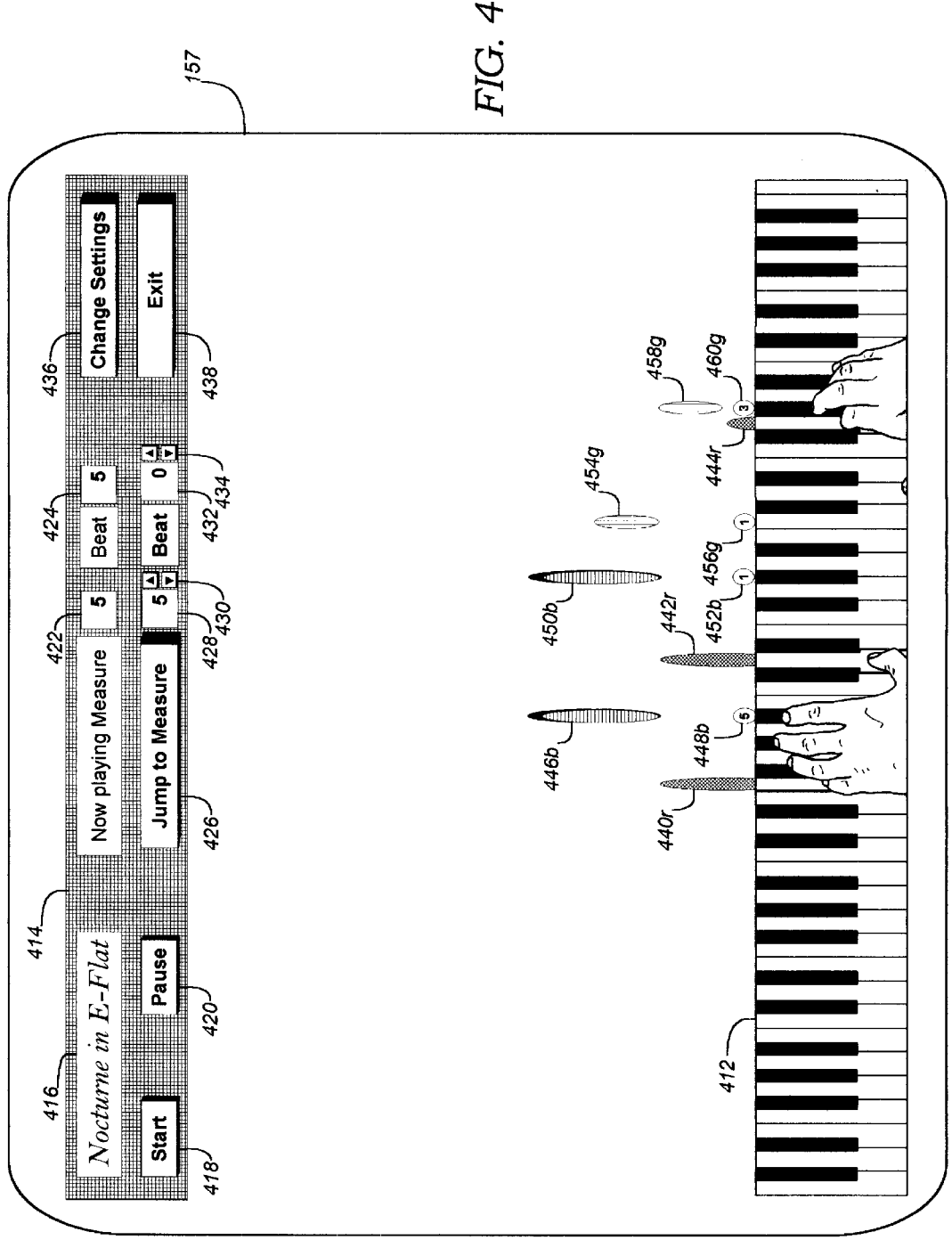
FIG. 4 shows a planned view of the display in operation.

FIG. 4 shows a display in use of the device. The Action Screen 157 is where the animation takes place, guiding the user's hands to the proper keys at the proper time. Across the top of the screen is a monitoring and control bar 414 that contains various edit boxes, buttons, and labels for displaying and directing the progress of the performance. Control is exercised by placement of the cursor over the appropriate button, followed by a left click of the mouse.

The name 416 of the selected piece is displayed above the buttons for starting 418 and pausing 420 the animation. The most recently played beat number is displayed in box 424 beside its corresponding measure number in box 422. Directly beneath these boxes are user writable edit boxes 428 and 432 that allow the user to enter measure and beat numbers different from the current values, should he wish to click the "Jump to Measure" button 426 and restart play from some other position in the piece. The Measure edit box 428 defaults to the current number in the box 422 above. The Beat edit box 432 defaults to zero, so clicking button 426 normally resumes play at the beginning of the current measure. Overrides for the measure and beat defaults can be entered manually in the edit boxes by clicking the corresponding up-down arrows 430 and 434, or by typing in numbers with the computer keyboard. Once an override is entered in box 428 it remains fixed until the button 426 is clicked, after which default updating resumes. An entry in box 432 remains unchanged until altered by the user. The "Change Settings" button 436 hides the Action Screen and displays the Set-Up screen 143. The "Exit" button 438 closes the program.

Across the bottom of the screen is a dummy image (bitmap) of the piano keyboard. The dummy image serves as a template for sizing and aligning the live video image 412 of the real piano keyboard. The live image is dragged over the bitmap to hide all but a narrow (~3 mm) strip at the top of the bitmap. The live image then is sized and dragged left or right until the two images are in registration. The live image then can be dragged up the last few millimeters to completely hide the bitmap image. Optionally, the alignment procedure may be automated.

The animation activity takes place in the area between the keyboard image 412 and the monitoring and control bar 414. Time is the vertical co-ordinate in this space. The horizontal co-ordinate is distance along the keyboard, in one-to-one correspondence with the bordering keyboard image. The term 'horizontal' means generally parallel to the keyboard. Each key to be struck within one beat of time is designated by a colored "sprite", for example 446, directly above, and moving steadily downward toward the image of that key. The distance in pixels from the top of the keyboard image to the leading edge of a sprite at any instant is the product of the sprite velocity in pixels per second, and the time in seconds remaining until the key is to be struck. A targeted key is played by the musician when the corresponding sprite first touches the key's image on the screen. This point in time is enunciated by an abrupt change in color of the sprite, for example, to red. Thus, like a skeet shooter taking a bead on his target, the musician views each approaching note in advance of playing it. In the live image of his hands passing over the keys, he sees his fingers converge with the sprites for the strike.

Figure 5:
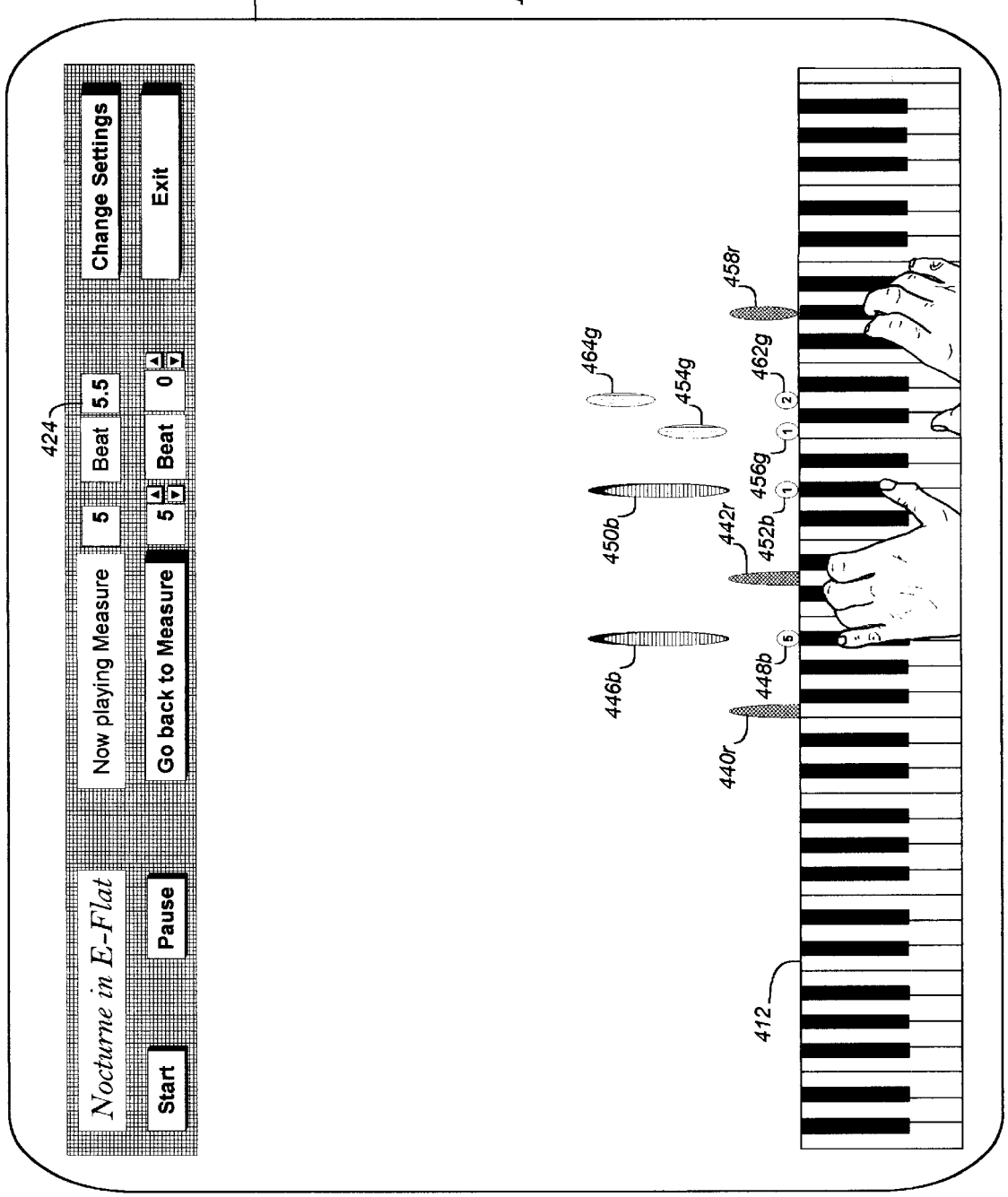
FIG. 5 shows a planned view of the display of FIG. 4, but at a later point in time.

FIGS. 4 through 6 include sprites of various color or hatching. The designation of colors will be depicted with reference to the identification numbers on the drawing by an indication of "r" for red, "b" for blue, and "g" for green.

Having changed color to red a sprite continues its downward motion, sliding steadily behind the key image until the sprite has disappeared. Since the vertical length of the sprite is created equivalent to the duration of its corresponding note, the moment of its disappearance is when the key should be released. (If the damper pedal is depressed the key can, of course, be released sooner.) More explicitly, the vertical length of a sprite in pixels is the product of the sprite velocity in pixels per second and the duration in seconds of the note it represents, as determined by the note type (quarter note, eighth note, etc.,) the time signature of the piece, the metronome setting, and any departure from metronome tempo. In the absence of tempo variations, a quarter-note sprite, for example, is twice as long as an eighth-note sprite.

The downward velocity of all sprites is equal and constant, independent of metronome setting 146 or tempo variations 154. At 1024×768 resolution, a 6 pixel jump every 56 milliseconds results in a suitably viewable sprite velocity of 107 pixels per second. (In the real world, the 56-millisecond timer interval fluctuates with varying load on the CPU. To maintain a constant average sprite speed, the size of each jump is adjusted to compensate for the concurrent deviation from the nominal 56-millisecond interval.) To keep the display uncluttered, new sprites first appear when they are within just one beat of being played. Tempo variations, however, cause the time interval for a beat to fluctuate. Consequently the distance from the keyboard image to the initial sprite positions will vary with tempo. When tempo is changing from beat to beat, it is the interval of the previous beat that sets the distance of newly-appearing sprites above the keyboard image. Of course, the sprites' vertical lengths also fluctuate with tempo, so a speed-up of tempo, for example, results in a vertical compression of the visible animation.

In the illustrated embodiment, blue sprites indicate notes to be played with the left hand, and green sprites indicate notes to be played with the right hand. Color saturation of the sprites indicates the loudness of the note to be played, with a gradation from light pastels for pianissimo, to bright, richly saturated colors for fortissimo. A black bottom edge on a sprite indicates that the damper pedal should be depressed when the sprite touches the key image. A black top edge on a sprite indicates that the damper pedal should be released when the last of the sprite disappears behind the key image.

The design of the sprites can convey other information carried in musical notation as well. The rounded edges and full length of the sprites illustrated here represent legato, or slurred notes played smoothly and evenly. Sprites having slightly clipped ends represent portamento, or more deliberate execution. Staccato is shown by more severe clipping, significantly shortening and squaring the sprites to indicate notes that are abruptly disconnected. A martellato is represented by a sprite with a completely flat leading edge to signify a note to be "hammered".

To assist the user in identifying the key targeted by an approaching but still distant sprite, for example the b-flat targeted by sprite 446b, a small circular field 448b (call it a "keylight") of the same color as the sprite, but fixed in position immediately above the image of the key, appears simultaneously with the sprite. Within the keylight is a bold Arabic numeral to indicate the finger to be placed on the key, 1 for thumb, 2 for index finger, etc. The keylight persists until contacted by the sprite, at which time the keylight vanishes. Should another sprite target the same key before the previous sprite has cleared, the most recent keylight is superimposed on whatever sprite or earlier keylight occupies the keylight position.

The illustration finds the animation just beyond the playing of measure 5, beat 5 of the Chopin Nocturne in E-Flat. The measure and beat numbers for the most-recently played notes are displayed in boxes 422 and 424. Sprites for notes already played 440r, 442r, and 444r, have turned red and are sliding behind the keyboard image. The user's fingers are still on the respective keys. Four sprites for about-to-be-played notes 446b, 450b, 454g, and 458g, are approaching the keyboard image from above. Their respective "keylights" 448b, 452b, 456g, and 460g, are in place.

Tempo variations have been set to zero and the metronome has been set at 60 beats per minute for this illustration, so the beat interval in this case is exactly one second. The time signature for this piece is 12/8, meaning that there are 12 beats per measure, and an $8^{th}$ note gets one beat. Each of sprites 446b and 450b represents an $8^{th}$ note, and therefore each has a vertical length equivalent to one second of time. These two sprites are a little less than one second from contact with the keyboard image. Their blue color signals that they are to be played with the left hand, and their keylight numbers designate the thumb for 450b and the little finger for 446b.

Sprites 454g and 458g represent $16^{th}$ notes. They are one-half second long, and their keylights and color indicate that they are to be played with the thumb and third finger of the right hand. Sprite 458g being closer to the keyboard image will be played first. It is scheduled for play on beat 5½, about a quarter-second hence. Sprites 446b, 450b, and 454g are scheduled for play on beat 6, about three quarters of a second hence.

FIG. 5 is a snapshot of the Action Screen about one-quarter second later than illustrated in FIG. 4. Here the action is just at the start of beat 5.5. All of the sprites of FIG. 4 have moved downward, with sprite 444 having slid completely from view. Sprite 458r has just touched the keyboard image and changed color to red, indicating that now is the time to play the targeted a-flat. The corresponding keylight 460 has vanished. A new sprite 464g has appeared, its corresponding note now being within one beat of the keyboard image. Color-coding and the keylight for the new sprite indicate that it is to be played with the index finger of the right hand.

FIG. 6 is a snapshot of the Action Screen one-half second later than illustrated in FIG. 5. Here the action is just at the start of beat 6. All of the sprites of FIG. 5 have moved downward, with sprites 440, 442, and 458 having slid completely from view. Sprites 446r, 450r, and 454r have just touched the keyboard image and changed color to red, indicating that now is the moment to play the respective b-flat, a-flat, and c keys. The corresponding keylights 448, 452, and 456 have vanished. The black tops on sprites 446, 450, and 464 signal the release of the damper pedal at the moment these sprites slip from view.

Two new sprites have appeared, since their corresponding notes are now within one beat of play. Sprite 470b represents an $8^{th}$ note, and its color and keylight 472b indicate that it is to be played with the little finger of the left hand. Sprite 466g represents a dotted quarter note (three seconds in duration). Its color and keylight 468g indicate that it is to be played with the third finger of the right hand. The black bottoms on sprites 470 and 466 indicate that the damper pedal should be pressed back down when these sprites contact the keyboard image and turn red. (Technically, since the contact of the black-bottomed sprites with the keyboard image is simultaneous with the disappearance of the black-topped sprites, the damper pedal also has to be released and depressed simultaneously. This is not possible, but it is understood in this case that the pedal should be released, then immediately pressed back down.)

The top of the long sprite 466 is initially only a short distance from the monitoring and control bar at the top of the screen. It would take only a small decrease in tempo to stretch the sprite beyond the lower edge of the bar. When this situation occurs, only the portion of the sprite between the bar and the keyboard image is visible. As the sprite scrolls downward, the top eventually emerges from behind the bar, and continues on to disappear behind the keyboard image at the proper time.

FIGS. 4–6 represent less than one second of elapsed time out of about six minutes for the entire 35 measures of the nocturne at this reduced tempo. At normal tempo (130 beats per minute) the piece takes about three minutes.

The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

What is claimed is:

1. A method for prompting play of a musical score by a user of a musical instrument having a keyboard actuated by the user's hands, comprising the steps of:
    displaying a graphical representation of at least a portion of the musical score for viewing by the user,
    imaging in real time at least a portion of the keyboard and the said user's hands,
    displaying to the user at least a portion of the image of the keyboard and user's hands in correlation with the display of the graphical representation of the musical score.

2. The method for prompting play of a musical score by a user of a musical instrument of claim 1 wherein the displaying is provided on a monitor.

3. The method for prompting play of a musical score by a user of a musical instrument of claim 1 wherein the musical instrument is a keyboard instrument.

4. The method for prompting play of a musical score by a user of a musical instrument of claim 3 wherein the keyboard instrument is a piano.

5. The method for prompting play of a musical score by a user of a musical instrument of claim 3 wherein the keyboard instrument is an organ.

6. The method for prompting play of a musical score by a user of a musical instrument of claim 1 wherein the notes are depicted by graphical animation which is registered in a horizontal manner to the key to be actuated.

7. The method for prompting play of a musical score by a user of a musical instrument of claim 1 wherein the notes are depicted by graphical animation which is registered in a horizontal manner to the key to be actuated and provided to the user prior to the time of actuation of the key as required by the musical score and progressing over time, culminating in an indication to the user that actuation of the key is then required by the musical score.

8. The method of claim 7 wherein the graphical animation of the note is moved in a vertical direction.

9. The method of claim 8 wherein the motion in the vertical direction is linear in time.

10. A method for prompting playing a musical score by the user of a musical instrument having a keyboard actuated by the user's hands, comprising the steps of:
   displaying the musical notes of the score to the user, wherein the notes are depicted by graphical animation, the depiction of the note being:
      registered in a horizontal manner to the key to be actuated, and
      provided to the user prior to the time of actuation of the key as required by the musical score and progressing over time, culminating in an indication to the user that actuation of the key is then required by the musical score, and
   displaying a real time image of the user's hands adjacent the keyboard.

11. The method of claim 10 wherein the graphical animation of the note is moved in a vertical direction.

12. The method of claim 11 wherein the motion in the vertical direction is linear in time.

13. The method of claim 10 wherein the culmination of the graphical display for a note consists of a juxtaposition of the image with the key to be played.

14. The method of claim 10 wherein the graphical animation of the note changes in size as a function of time.

15. The method of claim 10 wherein the graphical animation of the note changes in intensity as a function of time.

16. The method of claim 10 wherein the graphical animation of the note changes in orientation as a function of time.

17. The method of claim 10 wherein the graphical animation of the note changes in appearance as a function of time.

18. The method of claim 10 wherein the graphical animation of the note changes in color as a function of time.

19. The method of claim 10 wherein the graphical image of the note is present to the user sufficiently prior to the time of actuation to permit the user to place their hands for timely actuation of the key.

20. The method of claim 10 further including an additional graphical display adjacent to the key to be actuated.

21. The method of claim 20 wherein the additional graphical display indicates the desired finger number to actuate the key.

22. The method of claim 21 wherein the finger number is a numeric indication.

23. The method of claim 20 wherein the additional graphical display is presented at the same time as the depiction of the note.

24. The method of claim 20 wherein the additional graphical display is fixed in position with its lowest point in contact with the targeted key.

25. The method of claim 10 further including the step of imaging a musical score and generating the graphical animation therefrom.

26. A method for displaying a musical score to a user of a musical instrument having a plurality of keys comprising the steps of:
   graphically depicting an object corresponding to a note to be played, the graphical position including a position relative to the key to be actuated, the graphical depiction of the note including a depiction of the method of attack of the play of the note, and
   a temporal dimension indicating both the time for actuation of the note and the duration of the activation of the note.

27. The method of claim 26 wherein the graphical depiction further includes the loudness of play of the note.

28. The method of claim 26 wherein the method of attack is selected from the group consisting of: staccato and slur.

29. The method of claim 26 wherein the graphical depiction further includes an indication of an addition action to be performed by the user.

30. The method of claim 29 wherein the additional action includes pedal actuation.

31. A computer readable code for use in a system for aiding in play of a musical instrument for implementing the method of claims 1, 10 or 26.

* * * * *